United States Patent [19]

Hart

[11] Patent Number: 4,786,117

[45] Date of Patent: Nov. 22, 1988

[54] VARIABLE LOAD VALVE

[75] Inventor: James E. Hart, Trafford, Pa.

[73] Assignee: American Standard Inc., Wilmerding, Pa.

[21] Appl. No.: 71,437

[22] Filed: Jul. 9, 1987

[51] Int. Cl.$^4$ .................. B60T 8/18; B60T 15/52; B60T 11/34

[52] U.S. Cl. .................. 303/22.6; 303/22.5; 303/36; 303/85

[58] Field of Search ............ 303/2, 22 A, 22 R, 23 A, 303/33, 35, 36, 37, 40, 57, 85, 22.1, 22.5, 22.6, 22.7; 188/195; 105/215.2

[56] References Cited

U.S. PATENT DOCUMENTS

| | | | |
|---|---|---|---|
| 2,178,928 | 11/1939 | Campbell | 303/2 |
| 2,918,332 | 12/1959 | Hines | 303/85 |
| 3,169,801 | 2/1965 | Racki | 303/22 R |
| 3,275,380 | 9/1966 | May | 303/22 A X |
| 3,385,636 | 5/1968 | Cruse | 303/85 X |
| 4,127,308 | 11/1978 | McEathron | 303/57 X |
| 4,387,933 | 6/1983 | Cripe | 303/22 A |

Primary Examiner—Andres Kashnikow
Assistant Examiner—Timothy Newholm
Attorney, Agent, or Firm—G. J. Falce

[57] ABSTRACT

A variable load brake control equipment for a road/rail type vehicle comprising variable load brake apparatus located between the auxiliary reservoir and a supplemental volume reservoir in the supply line upstream of the vehicle control valve device. During braking, the auxiliary reservoir pressure and the supplemental volume reservoir pressure combine to provide an unmodulated buildup of brake pressure until the brake pressure reaches a value that varies as a function of the vehicle load. At this point, the variable load valve device operates to isolate the auxiliary reservoir, so that a continued buildup of brake pressure is modulated by reason of the fact that the supplemental volume reservoir alone supplies braking pressure.

24 Claims, 5 Drawing Sheets

VARIABLE LOAD VALVE

BACKGROUND OF THE INVENTION

The present invention relates to a variable load brake control device for rail vehicles and particularly for rail vehicles having a brake control system based on the pressure equalization principle of brake control.

Specialized freight vehicles, such as convertible rail/road cars that are adaptable for hauling by a locomotive in rail service and a truck tractor in highway service, typically employ air springs between the car body and underframe for optimal cushioning in both rail and road service. Having air springs that reflect the car load in accordance with the air spring pressure, these specialized cars lend themselves to variable load brake control as opposed to the more traditional empty/load type brake control employed in freight type rail service. The advantage of variable load type brake control over empty/load type control is that regardless of the vehicle load weight, a braking ratio can be achieved whereby the maximum braking effort approaches, but does not exceed the wheel/rail adhesion threshold, irrespective of the vehicle load condition.

These specialized freight cars are equipped with conventional direct release type freight brake control valves, such as the well-known ABD type control valve, for controlling the vehicle brakes when operating in rail service. The direct release ABD type control valve operates on the pressure equalization principle, in which a slide valve is positioned by the service valve piston, in response to a brake pipe pressure reduction effective on one side, to connect compressed air from an auxiliary reservoir to the car brake cylinder(s). When this auxiliary reservoir pressure effective on the opposite side of the service valve piston decreases slightly below the brake pipe pressure, the service piston moves to lap position in which a slide valve interrupts further flow of compressed air from the auxiliary reservoir to the brake cylinder(s). The auxiliary reservoir and brake cylinder volumes are chosen so that, when a predetermined full service reduction of brake pipe pressure is made, complete equalization will occur therebetween and no further increase in brake cylinder pressure can be obtained short of making an emergency brake application. A control valve of the aforementioned type offers the advantage of lower cost than alternative type proportional control valves.

SUMMARY OF THE INVENTION

It is an object of the present invention to locate a pressure limiting valve in the auxiliary reservoir supply line to the car control valve in order to obtain a load modulated service brake pressure that varies as a function of the vehicle load;

Another object of the invention is to provide a volume reservoir separate from the auxiliary reservoir in the auxiliary reservoir supply line to provide a modulated buildup of brake pressure following cut-off of the auxiliary reservoir supply by the service limiting valve;

Still another object of the invention is to modify a freight type brake system in accordance with the foregoing objectives without adversely affecting response of the car control valve;

Yet another object of the invention is to employ an emergency pressure limiting valve in the emergency reservoir supply line to provide a load modulated emergency brake pressure;

A still further object is to locate the emergency limiting valve in the brake cylinder delivery line to obtain more positive control of the emergency modulated brake pressure; and A final object of the invention is to provide a variable load valve arrangement in accordance with the foregoing objectives, wherein the load modulated service brake pressure builds up in two stages.

In fulfilling these objectives, a variable load valve arrangement is provided including an air spring pressure controlled limiting valve located in the supply line between the auxiliary reservoir and a supplemental volume reservoir. The limiting valve operates to cut off the supply of the main auxiliary reservoir pressure to the brake cylinder when the brake cylinder pressure reaches a predetermined value that varies with the car load. Following cut-off by the limiting valve, the volume reservoir pressure continues to supply brake cylinder until equalization is reached or the car control valve laps off, due to the supplemental volume reservoir pressure decreasing to about the effective brake pipe pressure.

In a first embodiment of the invention, the variable load valve further includes an air spring controlled emergency limiting valve located in the supply line between the emergency reservoir and car control valve to provide a modulated emergency brake pressure, by interrupting pressure equalization between the emergency reservoir and brake cylinder(s) at a brake pressure that varies with the car load. In a second embodiment, the emergency limiting valve is located in the brake cylinder delivery line between the control valve and brake cylinder(s).

In each embodiment, the service limiting valve may employ either a normally open cut-off valve with a control piston subject to brake cylinder feedback pressure opposing the load responsive air spring pressure, or a normally closed cut-off valve subject to a differential pressure force that opposes the force of the load responsive air spring pressure acting on the control piston. In the first instance, the modulated service brake pressure increases gradually as the degree of brake application increases from a cut-off pressure that varies as a function of the car load. In the second instance, the modulated service brake pressure increases gradually from a predetermined minimum brake pressure, and thence increases more rapidly upon the brake pressure reaching a value that varies according to the car load. In either instance, only a fully loaded car brake pressure is unmodulated throughout the brake pressure buildup.

BRIEF EXPLANATION OF THE DRAWINGS

These and other objects and advantages of the invention will become apparent from the following more detailed explanation when taken in conjunction with the accompanying drawings in which.

DESCRIPTION AND OPERATION

Figure 1:
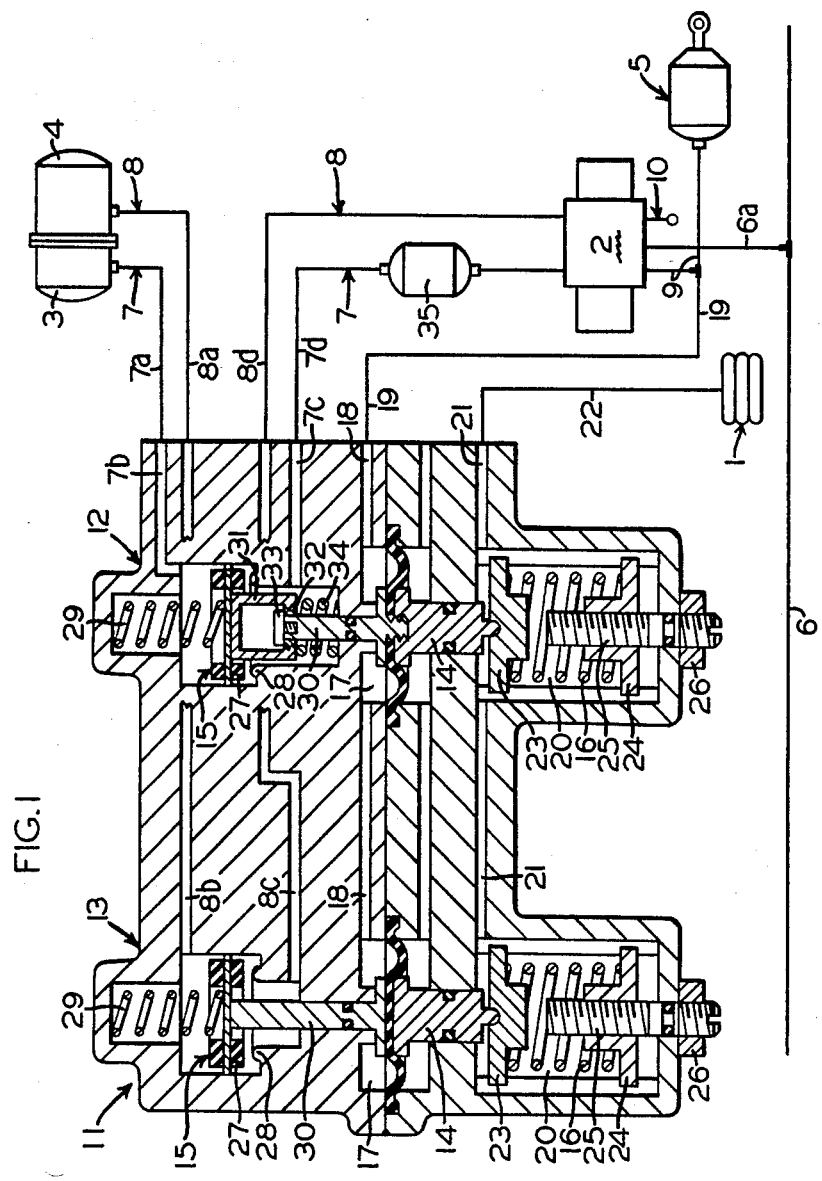
FIG. 1 is a schematic showing one embodiment of a variable load valve arrangement for a railway car in which a pressure limiting valve subject to the car air spring pressure is located in the respective auxiliary and emergency supply lines to the car control valve to provide a load modulated service and emergency brake pressure.

Referring now to FIG. 1 of the drawings, there is shown a brake system for controlling the brakes on a convertible rail/road type freight carrying vehicle when operating in rail service. Such vehicles employ air springs to support the cargo bed. Since the air spring pressure automatically increases with the cargo load, the arrangement readily lends itself to variable load type brake control.

The brake system for each car includes, in addition to air springs 1, a control valve device 2, an auxiliary reservoir 3, an emergency reservoir 4, and brake cylinder(s) 5. A brake pipe 6 extends through the car and is connected by a branch pipe 6a to control valve 2, which is preferably a conventional freight brake type of triple valve device, such as a standard ABD control valve, that operates on the well-known pressure equalization principle. Connected between conrol valve 2 and auxiliary reservoir 3 is a service brake supply pipe 7 and between control valve 2 and emergency reservoir 4 is an emergency supply pipe 8. A brake cylinder delivery pipe 9 connects control valve 2 to brake cylinder(s) 5 and a vent pipe 10 is connected from control valve 2 to atmosphere.

In the embodiment of FIG. 1, a variable load valve portion 11 is connected into the brake system at the service and emergency supply pipes and includes a pressure limiting service valve 12 and a pressure limiting emergency valve 13.

Pressure limiting emergency valve 13 is preferrably a well known, standard type variable load valve typically employed in transit and passenger type railway vehicles, and includes a control piston 14, cut-off check valve 15, and adjustable spring 16. One surface of piston 14 is subject to brake cylinder pressure in a feedback chamber 17 to which a feedback passage 18 and branch pipe 19 of brake cylinder delivery pipe 9 is connected. An opposing surface of piston 14 is subject to air spring pressure in a chamber 20 that is communicated with air springs 1 via a passage 21 and pipe 22.

Adjustable spring 16 is housed in chamber 20 with one end bearing against a seat 23, with which piston 14 is engageable, and the other end bearing against a seat 24 having a threaded opening to receive a correspondingly threaded screw 25. Rotation of screw 25 changes the vertical position of seat 24 thereon, since seat 24 is prevented from rotation by engagement with a vertical slot or flute in the casing of chamber 20. In this manner, the degree of compression of spring 16 can be selectively adjusted, in accordance with the range of air spring pressures between an empty and fully loaded car, to provide the emergency pressure setting at which emergency limiting valve 13 operates. A nut 26 locks screw 25 against rotation, when the desired adjustment of spring 16 is obtained.

Check valve 15 is comprised of a disc valve element 27 and an annular valve seat 28, with which valve element 27 is engageable under the influence of a light spring 29. A stem 30 fixed to piston 14 is adapted to engage and normally hold valve element 27 unseated under the combined force of spring 16 and the air spring pressure effective in chamber 20. In this sense, the cut-off check valve of emergency limiting valve 13 is normally open. A segment 8a of emergency supply pipe 8 is connected to the upstream side of check valve 15 via a passage 8b and the downstream side of check valve 15 is connected via a passage 8c to a pipe segment 8d of emergency supply pipe 8.

Pressure limiting service valve 12 is similar to emergency limiting valve 13, except for its cut-off check valve and piston stem. Thus, the corresponding parts are identified by like reference numerals. Cut-off check valve 15 comprises a disc valve element 27 and an annular valve seat 28 with which valve element 27 is engageable under the influence of a light spring 29. Engageable with the underside of valve element 27 is one end of a hollow member 31 having an inturned flange 32 at its opposite end. Flange 32 extends into the hollow of member 31, in order to engage and support a shoulder 33 formed on the end of piston stem 30. Another spring 34, which is slightly stronger than spring 29, acts against the bottom of sleeve 31 to urge check valve element 27 off its seat 28 in opposition to spring 29. A segment 7a of auxiliary supply pipe 7 is connected to the upstream side of service limiting check valve 15 via a passage 7b, and the downstream side of service limiting check valve 15 is connected via a passage 7c to a pipe segment 7d of auxiliary supply pipe 7. A supplemental volume reservoir 35 is piped into segment 7d of the auxiliary reservoir supply pipe 7.

Brake cylinder feedback passage 18 also connects feedback chamber 17 of service limiting valve 12 to brake cylinder(s) 5 via branch pipe 19 of the brake cylinder delivery pipe 9. Also, a passage 21 connects chamber 20 of service limiting valve 12, to air springs 1 via pipe 22. It should also be noted that the adjustable spring 16 of emergency limiting valve 13 is set to exert a greater spring force than that of spring 16 of service limiting valve 12.

During charging, the compressed air supplied to brake pipe 6 is connected via control valve 2 to segments 7d and 8d of the respective service and emergency supply pipes 7 and 8. The air in segment 7d flows to auxiliary reservoir 3 via volume reservoir 35, passage 7c , the open cut-off check valve 15 of service limiting valve 12, passage 7b, and pipe 7a. Similarly, emergency reservoir 4 is charged by the connection of compressed air in pipe 8d to passage 8c, the open cut-off check valve 15 of emergency limiting valve 13, passage 8b, and pipe segment 8a. Concurrently, control valve 2 establishes a connection between brake cylinder delivery pipe 9 and vent pipe 10 to maintain a release condition of the brakes. This connection also serves to maintain feedback chambers 17 of the respective service and emergency limiting valves vented, thereby assuring that springs 16, and the force of air spring pressure in chambers 20, acting through control pistons 14, is effective to maintain the respective cut-off check valves 15 in their open position, as shown. Consequently, the auxiliary reservoir, volume reservoir and emergency reservoir are charged to the pressure carried in brake pipe 6.

When a service brake application is desired, the pressure in brake pipe 6 is reduced at a sevice rate, as by an operator's standard brake valve device (not shown). Control valve 2 operates in response to this brake pipe pressure reduction to isolate the emergency reservoir air in supply pipe 8 from delivery pipe 9 and brake cylinder(s) 5, while at the same time, closing off vent pipe 10 and connecting auxiliary reservoir air to brake cylinder(s) 5 via the open service limiting check valve 15.

Figure 3:
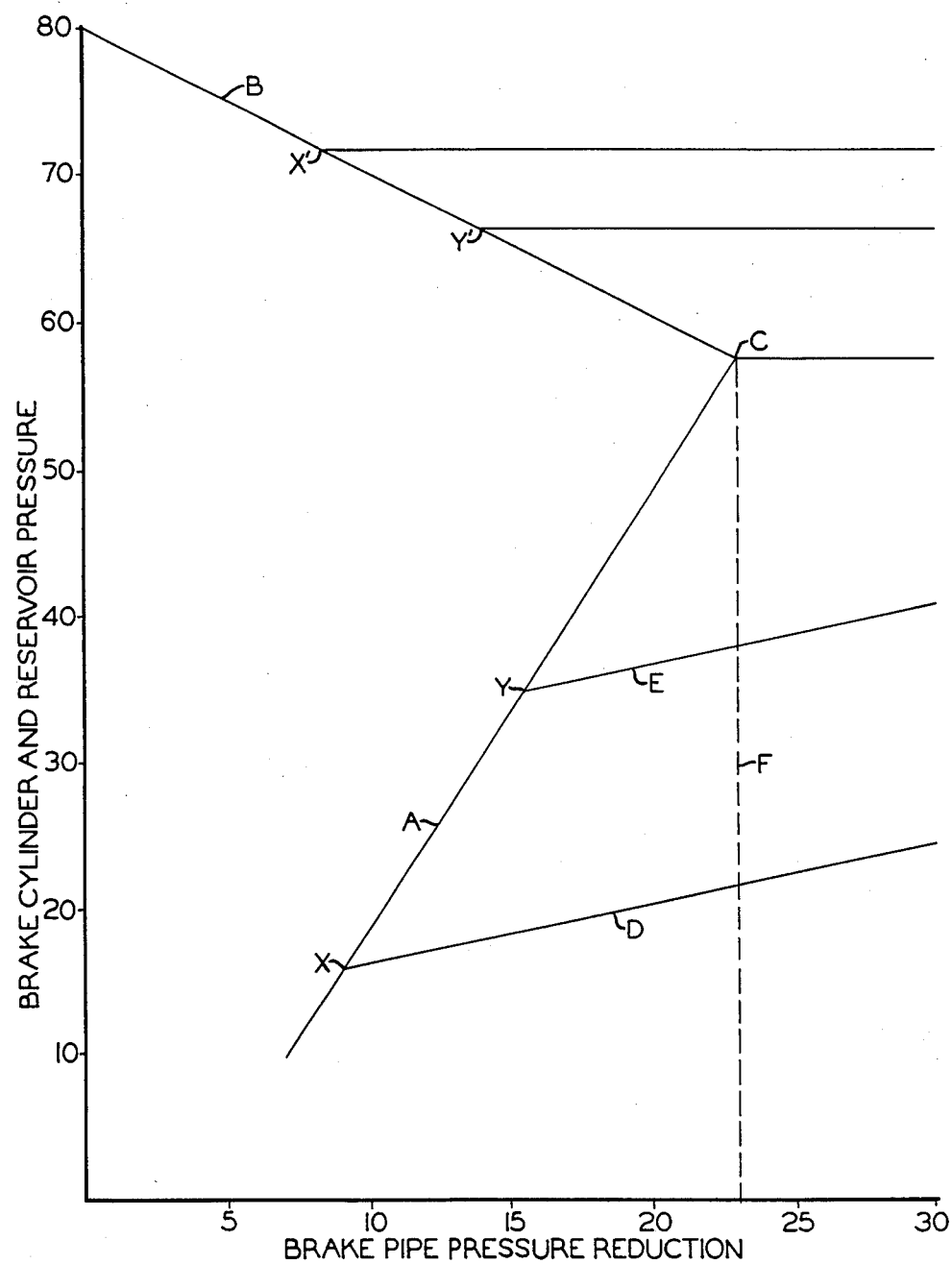
FIG. 3 is a graph showing the service brake pressure buildup curves under full and partial load conditions in accordance with the embodiments of FIGS. 1 and 2.

Under a full load condition, maximum air spring pressure exists in chamber 20 of service limiting valve 12 and the brake cylinder feedback pressure effective in chamber 17 is unable to overcome the opposing force on piston 14, due to the combined effect of this air spring pressure in chamber 20 and the force exerted by adjustable spring 16. Accordingly, service limiting valve piston 14 remains in its upwardmost position, in which cut-off check valve 15 is held open, thereby allowing pressure equalization to take place between auxiliary reservoir 3, volume reservoir 35, and brake cylinder(s) 5. This pressure equalization is represented in the graph of FIG. 3 by curve (A) corresponding to the brake cylinder pressure increasing, and by curve (B) corresponding to the combined auxiliary reservoir pressure and supplemental volume reservoir pressure decreasing, until full pressure equalization occurs at point (C) corresponding to a full service reduction of brake pipe pressure. As is well known in brake operation employing the pressure equalization principle, full pressure equalization between the reservoirs and brake cylinder(s) occurs when a predetermined full service reduction of brake pipe pressure is made. As is also well known, control valve 2 operates in response to service brake pipe reductions less than a full service reduction, to interrupt the pressure supply to brake cylinder prior to full equalization occurring. In this manner, the brake application pressure is controlled by operation of control valve 2 in response to varying degrees of brake pipe reduction from the pressure to which the brake pipe and reservoirs were initially charged.

Under partial load conditions, variable load valve portion 11 becomes effective to modulate the brake cylinder pressure. For example, point (X) on curve (A) represents the point at which the brake cylinder pressure changes from a full load, unmodulated brake pressure buildup to an empty, modulated brake pressure. In an empty car condition, air spring pressure effective in chamber 20 is minimal. As the buildup of brake cylinder pressure via the unseated cut-off check valve takes place along curve (A), the force of the brake cylinder pressure effective in chamber 17 of service limiting valve 12 overcomes the opposing combined force of the air spring pressure and spring 16 acting on piston 14 to move piston 14 and its actuating stem 30 downwardly. Shoulder 33 formed on the end of stem 30 engages flange 32 to also pull sleeve 31 downward with stem 30. Valve element 27 of cut-off check valve 15 is thus forced into engagement with seat 28 by its spring 29, thereby effecting closure of service limiting cut-off valve 15. The point at which closure of cut-off valve 15 occurs corresponds to point (X) on curve (A) for an empty car load condition.

With closure of cut-off valve 15, auxiliary reservoir 3 is cut off from volume reservoir 35 at point (X') on curve (B). This point (X') corresponds to point (X) on curve (A) with respect to the level of brake pipe reduction. The pressure effective in volume reservoir 35, at the time of closure of cut-off valve 15, is thereafter available for equalization with brake cylinder(s) 5. Since the volume of reservoir 35 alone is obviously less than the combined volumes of reservoir 35 and auxiliary reservoir 3, it will be apparent that pressure equalization between the single volume reservoir 35 and brake cylinder(s) 5 will result in a buildup of the modulated brake cylinder pressure more gradually than the full load, unmodulated brake cylinder pressure buildup, as indicated by the slope of curve (D) in the graph of FIG. 3. The slope of this modulated brake cylinder pressure buildup curve is determined by the ratio of the volume of supplemental volume reservoir 35 to the volume of brake cylinder(s) 5. In addition, the size of volume reservoir 35 must be sufficiently large that the pressure in pipe segment 7d can only follow changes in brake pipe pressure at a relatively slow rate, since this would otherwise prevent a pressure differential from being established across the service piston (not shown) of control valve 2 to actuate the sevice piston in response to changes in brake pipe pressure.

Similarly, under a partial load condition, different values of air spring pressure will be effective in chamber 20 depending upon the load condition between empty and full load. It will be apparent, therefore, that as air spring pressure varies with the vehicle load condition, so does the point at which the service limiting cut-off valve 15 closes. This point is indicated at (Y) on curve (A) and corresponding point (Y') on curve (B). These corresponding points may lie anywhere along curves (A) and (B) between points (X), (X'), and (C). Following closure of service limiting cut-off valve 15, the pressure effective is supplemental volume reservoir 35 is effective to equalize with brake cylinder pressure and thereby provide a modulated buildup of brake cylinder pressure, as shown by the slope of the curve (E) in the graph of FIG. 3. While this modulated buildup of brake cylinder pressure during a partial load condition is the same as during an empty condition, as evidenced by the slope of curves (D) and (E) being identical, a greater brake cylinder pressure will result, for any given brake application, as the load condition increases, due to the fact that the unmodulated brake cylinder pressure at cut-off point (Y) is greater than at point (X). In the case of an empty or partial load condition less than full load, full pressure equalization between volume reservoir 35 and brake cylinder(s) 8 will not occur, except by making at least a full service reduction of brake pipe pressure, as represented by line (F) in the graph, and typically a brake pipe reduction in excess of a full service reduction. This is a function of the relatively small volume of reservoir 35 and assures that full pressure equalization does not occur at less than a full service reduction of brake pipe pressure regardless of the load condition, thereby minimizing the liklihood of an over-reduction and the attendant problems associated therewith, such as, a delayed brake release. A prompt and direct release of a service brake application is thus assured, as now explained.

When a brake release is desired, brake pipe pressure is increased, in the usual manner, and control valve 2 responds to exhaust brake cylinder air to atmosphere via vent pipe 10, while concurrently connecting brake pipe pressure to supplemental volume reservoir 35 and pipe segment 7d.

If a full load brake application is being released, service limiting cut-off valve 15 will have remained open during the brake application and the re-charge pressure supplied to pipe segment 7d will be connected past unseated valve element 27 to passage 7b, pipe segment 7a, and auxiliary reservoir 3, the same as during initial charging.

However, if an empty or partial load brake application is being released, service limiting cut-off valve 15 will have closed and will remain closed until such time as the air pressure in supplemental volume reservoir 35 is re-charged to within approximately 1 psi of the cut-off pressure effective in auxiliary reservoir 3. This prevents an inadvertent re-application of the brakes, as could otherwise occur, due to the higher auxiliary reservoir pressure back flowing into the supplemental volume reservoir at a pressure greater than the recharging brake pipe pressure. This requirement is carried out by reason of the fact that stem 30 is able to move in an upward direction without imparting movement to sleeve 31 and valve element 27. It will be appreciated, therefore, that as feedback pressure effective in chamber 17 exhausts with the direct exhaust of brake cylinder pressure, the force of air spring pressure and spring 16 acting on control piston 14, in opposition to the feedback pressure in chamber 17, urges upward movement of piston 14 and stem 30, without unseating valve element 27 from valve seat 28. Piston 14 of service limiting valve 12 is thus reset independently of cut-off valve 15, which is subsequently unseated to establish recharging of the auxiliary reservoir air only when the supplemental volume reservoir 35 is re-charged to approximately 1 psi of the air pressure trapped in the auxiliary reservoir at the time of cut-off by the limiting valve.

When an emergency brake application is desired, brake pipe pressure is completely exhausted in the usual manner. Service limiting valve 12 operates the same as in the foregoing explanation, while, concurrently, emergency limiting valve 13 is also effective to modulate the emergency brake pressure. Compressed air stored in emergency reservoir 4 is connected to brake cylinder(s) 5 via supply pipe segment 8a, passage 8b, open cut-off valve 15 of emergency limiting valve 13, passage 8c, pipe segment 8d, control valve 2, and brake cylinder delivery pipe 9, in parallel with the above explained supply of air in auxiliary reservoir 3 and/or supplemental volume reservoir 35 to brake cylinder(s) 5.

As previously noted, adjusting spring 16 of emergency limiting valve 13 is set higher than spring 16 of service limiting valve 12, and since both the auxiliary reservoir 3 and emergency reservoir 4 are interconnected at control valve 2 during emergency to feed brake cylinder(s) 5 in parallel, the brake cylinder pressure and thus feedback pressure effective in chamber 17 will be greater during emergency than during service brake applications for any given load condition.

Under full load conditions, the air spring pressure effective in chamber 20 of emergency limiting valve 13, and adjusting spring 16 thereof exert a force on piston 14 greater than the force exerted by the maximum brake cylinder feedback pressure effective in chamber 17. Piston 14 and stem 30 are thus maintained in their upwardmost position, as shown, in which emergency limiting cut-off valve 15 is held open to allow uninterrupted, full pressure equalization between auxiliary reservoir 3, emergency reservoir 4, and brake cylinder(s) 5.

Under empty or partial load conditions, the brake cylinder feedback pressure overcomes the opposing force of air spring pressure in chamber 20 and the force of adjustable spring 16 of emergency limiting valve 13 prior to the above-mentioned full pressure equalization occurring. At this time, stem 30 is moved downwardly by piston 14 out of engagement with valve element 27, which is accordingly forced into engagement with its seat 28 by spring 29 to cut off further pressure communication between emergency reservoir 4 and brake cylinder(s) 5.

This cut-off point will vary as a function of the vehicle load, but for any given load condition, the emergency brake cylinder pressure at the time of cut-off will be greater than full service brake pressure.

Increasing brake pipe pressure to release an emergency brake application causes control valve 2 to operate in a well-known manner, to exhaust brake cylinder pressure and release the brakes. This exhaust of brake cylinder pressure, in turn, causes service limiting valve 12 to operate, as previously described, and emergency limiting valve 13 to also operate, in response to the exhaust of brake cylinder feedback pressure effective in chamber 17, thereof. The emergency limiting cut-off valve is reset to its open position without any delay, however, as occurs with service limiting valve 12. Accordingly, as the brakes are released, emergency reservoir 4 is recharged to the pressure carried in brake pipe 6 via control valve 2, pipe segment 8d, passage 8c, open cut-off valve 15 of emergency limiting valve 13, passage 8b, and pipe segment 8a. Concurrently, volume reservoir 35 is recharged via control valve 2. When the pressure in volume reservoir 35 is recharged to approximately 1 psi of any pressure trapped in auxiliary reservoir 3 (due to an empty or partial load brake application), cut-off valve 15 of service limiting valve 12 is reset to its open position to provide final charging of auxiliary reservoir 3, as previously explained.

Figure 2:
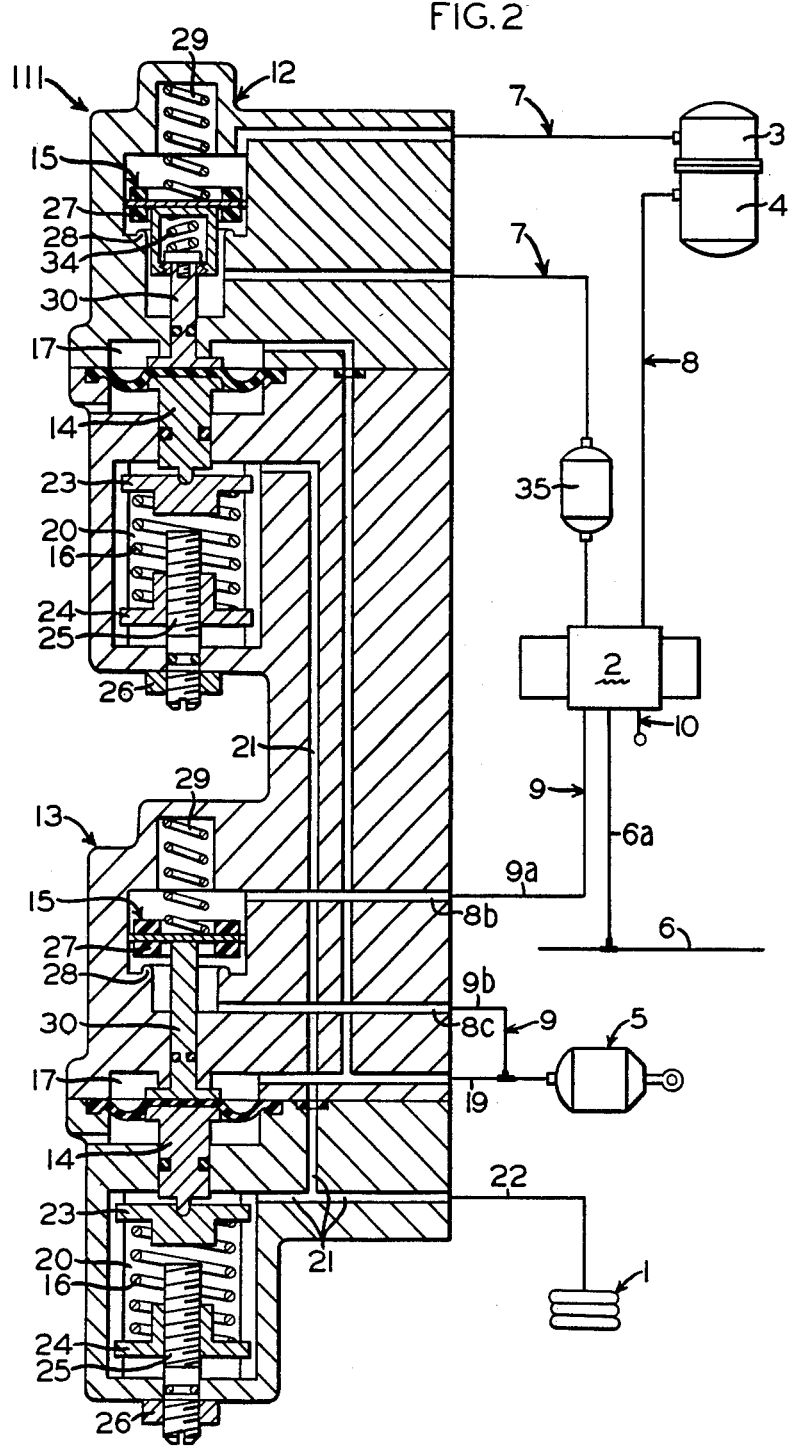
FIG. 2 is a schematic showing an alternate embodiment of a variable load valve arrangement that differs from that of FIG. 1 in that the emergency pressure limiting the valve is located in the brake cylinder delivery line between the car control valve and brake cylinder(s)

In FIG. 2 is shown a variable load valve portion 111 that differs from the variable load valve portion 11 of FIG. 1, in that emergency limiting valve 13 is located downstream of control valve 2, and the service limiting cut-off valve 15 has its spring 34 in the bore of sleeve member 31 with one end bearing against valve element 27 and the other end against piston stem 30. Passage 8b of emergency limiting valve 13 is thus connected to a pipe segment 9a of delivery pipe 9, and pipe segment 8c is connected to delivery pipe segment 9b.

During service brake applications, service limiting valve 12 operates the same as described relative to FIG. 1 and thus provides brake pressure buildup according to the curves of FIG. 3. It will be noted, however, that the brake cylinder delivery pressure during service braking is connected from control valve 2 to brake cylinder(s) 5 via delivery pipe segment 9a, passsage 8b, the open cut-off valve 15 of emergency limiting valve 13, passage 8c, and pipe segment 9b. Since the adjusting spring 16 of emergency limiting valve 13 is set higher than that of service limiting valve 12, the emergency limiting cut-off valve 15 is held open during service braking, so that, even though the delivery pressure from control valve 2 flows to the brake cylinder(s) 5 via the open emergency limiting cut-off valve, emergency limiting valve 13 has no influence upon the buildup of service brake cylinder pressure.

This embodiment of the invention has the advantage of isolating the supplemental volume reservoir 35 from brake cylinder(s) 5 during emergency braking, as compared to locating emergency limiting valve 13 upstream, i.e., in the emergency reservoir supply line, as in the embodiment of FIG. 1, wherein supplemental volume reservoir 35 remains in communication with brake cylinder(s) 5, even after closure of emergency limiting cut-off valve 15. Locating emergency limiting valve 13 downstream of control valve 2 thus provides positive control of the emergency brake pressure, since supplemental volume reservoir 35 is cut-off from the brake cylinder(s) 5 by closure of the emergency limiting cut-off valve during partial and empty load conditions, so that no further buildup of brake cylinder pressure can occur, by reason of further pressure equalization between volume reservoir 35 and brake cylinder(s) 5, following closure of the emergency limiting cut-off valve 15.

Release of either a service or emergency brake application is made similar to the manner in which the release function is accomplished in the embodiment of FIG. 1 and thus need not be repeated.

Figure 4:
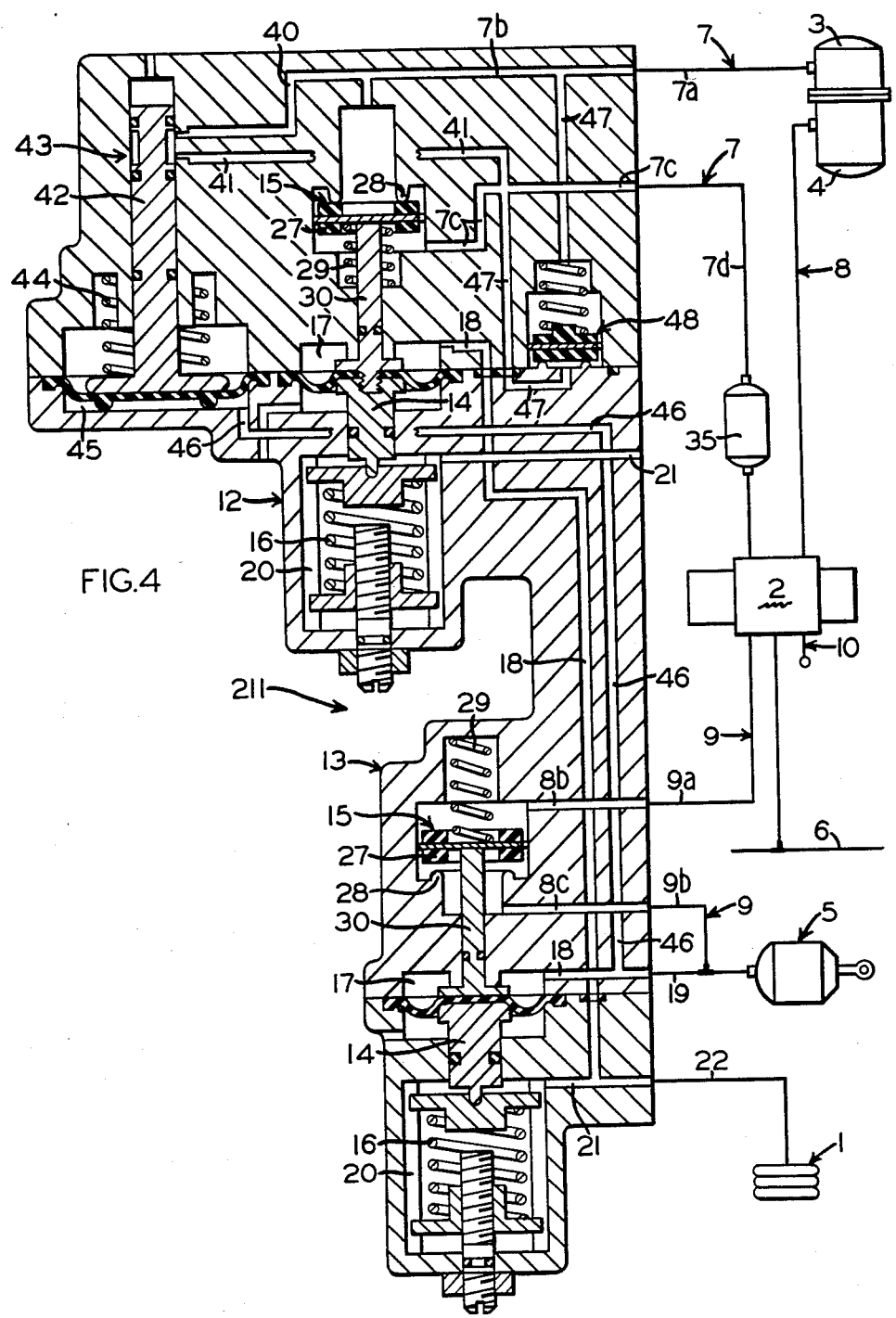
FIG. 4 is a schematic showing an alernate arrangement of a variable load valve as required to provide the service modulated brake pressure, in accordance with a different type of service pressure limiting valve.

Referring now to FIG. 4, there is shown a variable load valve portion 211, including a service limiting valve 12 arranged so that its cut-off valve 15 is normally closed. In other respects, service limiting valve 12 is the same as service limiting valve 12 of FIGS. 1 and 2 with corresponding parts being identified by like reference numerals. Cut-off check valve 15 comprises an annular valve seat 28 that is formed by the valve housing at the upper side of disc valve element 27 and a spring 29 that is located at the underside of valve element 27, in order to bias the valve element toward engagement with valve seat 28. It will also be noted that chamber 17 is connected to air springs 1 via passage 18 and pipe 22, while chamber 20 is vented via passage 21. Adjustable spring 16 is located in chamber 20, so as to urge piston 14 upwardly. Stem 30 of piston 14 thus transfers the differential piston force, due to the effective air spring pressure acting on one surface of piston 14 and the adjustment force of spring 16 acting on the opposite side, to hold valve element 27 seated, the differential force varying as a function of air spring pressure and thus the car load condition. Auxiliary reservoir 3 is connected to the upper side of valve element 27 via pipe segment 7a and passage 7b, while the underside is connected to control valve 2 via passage 7c, pipe segment 7d, and volume reservoir 35. A branch passage 40 of passage 7b and a branch passage 41 of passage 7c are normally connected via a piston spool valve 42 of an inshot valve 43. A spring 44 acts on one side of piston valve 42 and a chamber 45 formed on the opposite side is connected to brake cylinder(s) 5 via a passage 46 and feedback pipe 19. Another branch passage 47 is connected between passages 7b and 7c and contains a one-way charging check valve 48.

Variable load valve portion 211 also includes an emergency limiting valve 13 that may be arranged upstream of control valve 2, as in the embodiment of FIG. 1, or downstream of control valve 2, as in the embodiment of FIG. 2, the latter arrangement being selected for showing in FIG. 4. The emergency limiting valve 13 in FIG. 4 is identical to the emergency limiting valves shown and described relative to FIGS. 1 and 2, and should, therefore, require no further explanation.

During charging, the compressed air supplied to brake pipe 6 is connected via control valve 2 to the respective auxiliary and emergency supply pipes 7 and 8. The compressed air in segment 7d of supply pipe 7 flows to auxiliary reservoir 3 via passage 7c, passage 47, charging check valve 48, passage 7b, and pipe segment 7a. The air in passage 7c also flows to the underside of valve element 27, while the air in passage 7b flows to the upperside of valve element 27 to pressure balance the cut-off check valve 15. Emergency reservoir 4 is charged by the compressed air in pipe 8. Concurrently, control valve 2 establishes a connection between segment 9a of brake cylinder delivery pipe 9 and vent pipe 10 to maintain a release condition of the brakes. This connection also vents chamber 45 of inshot valve 43 via passage 46, feedback pipe 19, delivery pipe segment 9b, passage 8c, unseated cut-off valve element 27, passage 8b, delivery pipe segment 9a, control valve 2, and vent pipe 10. With chamber 45 thus vented, spring 44 is effective to position piston valve 42 to establish flow communication between passages 40 and 41, for a purpose hereinafter explained.

When a service brake application is desired, the pressure in brake pipe 6 is reduced at a service rate, as by an operator's standard brake valve device (not shown). Control valve 2 operates in response to this pressure reduction to isolate the emergency reservoir air in supply pipe 8 from brake cylinder delivery pipe 9a, while at the same time closing off vent pipe 10 and connecting auxiliary reservoir supply pipe segment 7d to delivery pipe segment 9a in a manner that is well known.

Spring 16 of service limiting valve 12 is adjusted to counterbalance the force exerted on piston 14 by the effective air spring pressure in chamber 17, consistent with a full load condition, so that substantially no differential piston force results. It will be appreciated from the foregoing that proportionally lighter car load conditions will result in proportionally greater differential forces on piston 14. This differential force on piston 14 always acts in an upward direction to effect closure of cut-off check valve 15 and is opposed by a fluid pressure differential force that develops across cut-off valve element 27, when a brake application is initiated, due to the flow of air from the underside of valve element 27 to brake cylinder(s) 5 via control valve 2.

Figure 5:
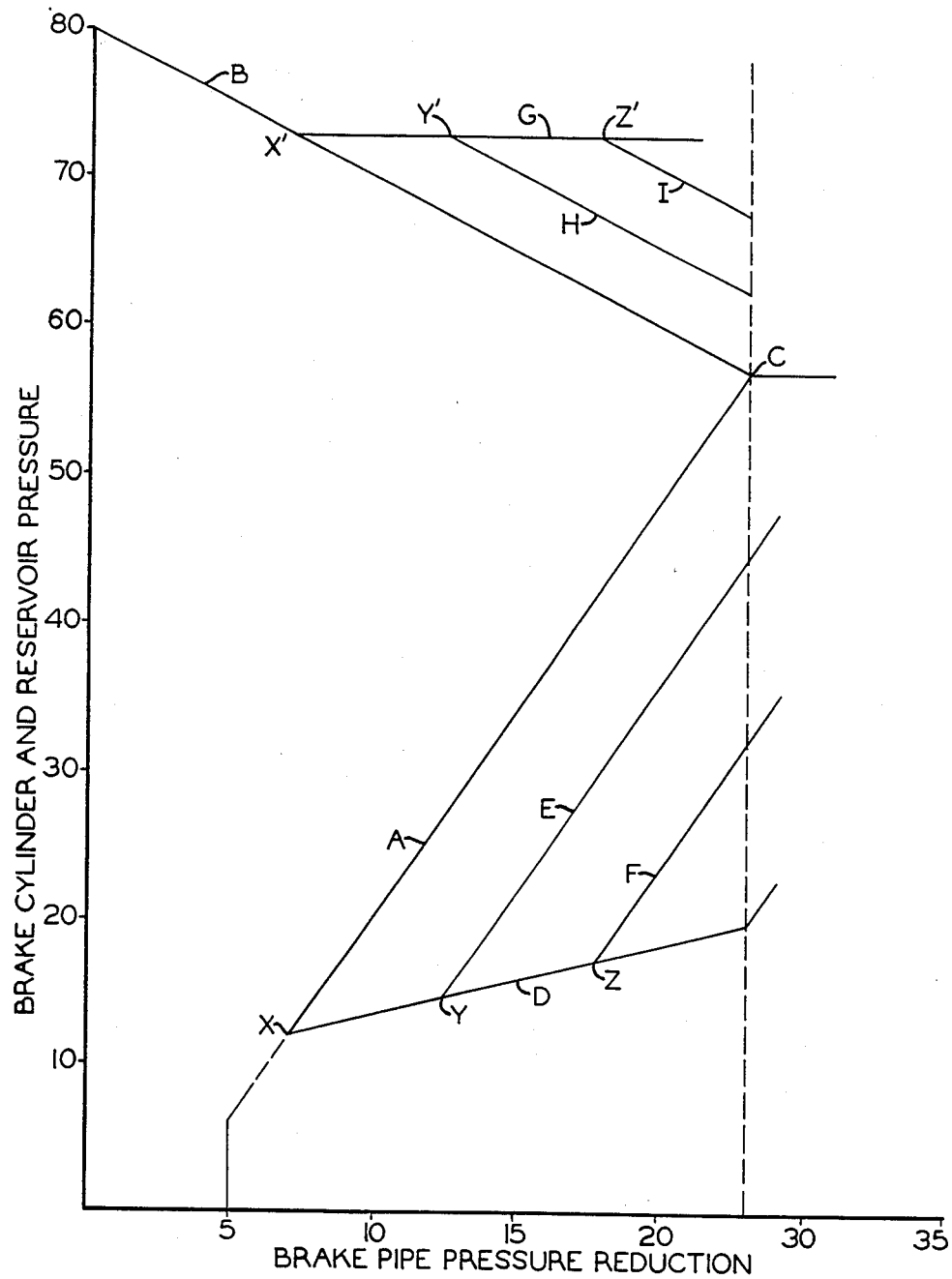
FIG. 5 is a graph showing the service brake pressure buildup curves under full and partial load conditions in accordance with the variable load valve arrangement of FIG. 4.

A service brake application under a full load condition, therefore, results in the differential pressure force across cut-off valve element 27 immediately opening valve element 27 against the differential piston force, which is minimal for full load condition, and the light force exerted by spring 29. The air stored in auxiliary reservoir 3 is thus connected to brake cylinder(s) 5 together with the air in volume reservoir 35, whereby an unmodulated buildup of brake cylinder pressure follows a full load curve (A), as shown in the graph of FIG. 5. Curve (B) in this graph represents the reducing auxiliary and volume reservoir pressures due to pressure equalization with brake cylinder(s) 5, the point at which full pressure equalization therebetween occurs being indicated at point (C), where curves (A) and (B) meet. As is well known in freight brake operation employing the pressure equalization principle of brake control, full pressure equalization occurs between the respective brake cylinder(s) and reservoirs when a predetermined full service brake pipe reduction of approximately 23 psi is made. As is also well known, control valve 2 operates in response to service brake pipe reductions less than full service to interrupt the pressure equalization prior to full equalization occurring. In this manner, the brake application pressure is controlled by operation of control valve 2 in response to varying degrees of brake pipe reduction from the pressure to which the brake pipe and reservoirs were initially charged.

During the above-discussed service brake application under full load conditions, inshot valve 43 is positioned by spring 44 to connect air from auxiliary reservoir 3 to brake cylinder(s) 5 in parallel with service limiting valve 12, via passages 40 and 41, until approximately 10-12 psi of brake pressure develops, at which point, the brake cylinder pressure acting on the face of piston 42 in opposition to the force of bias spring 44 effects closure of this parallel connection.

During a service brake application under an empty car condition, piston 14 of service limiting valve 12 is subject to a maximum force differential that establishes closure of cut-off valve element 27 to isolate the air in auxiliary reservoir 3 from brake cylinder(s) 5. However, inshot valve 43 is effective to supply auxiliary reservoir air to the brake cylinder(s) in bypass of the service limiting valve until 10-12 psi brake cylinder pressure develops, as indicated, at point (X) along curve (A) and at point (X') along curve (B). Thus, until point (X) is reached, brake cylinder pressure builds up unmodulated in accordance with the full load curve (A).

Following operation of inshot valve 43 to interrupt the bypass connection of auxiliary reservoir air to brake cylinder(s) 5, only supplemental volume reservoir 35 is available to supply air to brake cylinder(s) 5, so that a modulated buildup of brake cylinder pressure results, as indicated by curve (D) in the graph of FIG. 5, due to the pressure equalization of supplemental volume reservoir 35 with brake cylinder(s) 5. As long as service limiting cut-off valve 15 remains closed, equalizing reservoir pressure remains constant at its value at the time of closure of inshot valve 43, as indicated by curve (G).

For various partial loads, the force differential across piston 14 of service limiting valve 12 will not be as great as under empty conditions and, therefore, a force differential will eventually develop across cut-off valve element 27 sufficient to overcome the closure force exerted by piston 14 thereon. Once this occurs, valve element 27 is unseated from seat 28 to connect air in auxiliary reservoir 3 to brake cylinder(s) 5 via passages 7b and 7c, thereby allowing the modulated brake cylinder pressure to again build up in parallel with the unmodulated buildup curve (A). For example, in a ⅔ loaded car, cut-off valve element 27 opens as indicated at point (Y) on the modulated pressure curve (D) and at point (Y') on curve (B). At point (Y), the continued buildup of modulated brake pressure thereafter follows a curve (E) that is parallel to the unmodulated pressure buildup curve (A), due to pressure equalization between both the auxiliary and volume reservoir and brake cylinder(s) 5. Curve (H) thus represents the continued reduction of equalizing reservoir pressure following opening of the service limiting cut-off valve 15 at point (Y').

For a ⅓ loaded car, the force differential acting on piston 14 and effecting closure of cut-off valve element 27 is greater than for a ⅔ loaded car, so as to require a greater opposing force differential across cut-off valve element 27 to effect opening thereof, as indicated at point (Z) on the modulated pressure curve (D) and at point (Z') on curve (B). At point (Z), the continued buildup of modulated brake pressure thereafter follows a curve (F) that is parallel to curves (A) and (E), due to pressure equalization between both the auxiliary and volume reservoirs and brake cylinder(s) 5. Curve (I) thus represents the continued reduction of equalizing reservoir pressure following operation of the pressure limiting cut-off valve 15 at point (Z').

It will be seen, therefore, that during empty and partial load conditions, a two-stage buildup of modulated brake pressure results in accordance with the foregoing, wherein initially the brake cylinder pressure follows a shallow buildup curve and subsequently a steeper buildup curve corresponding to the unmodulated buildup of brake pressure effective under full load conditions.

When an emergency brake application is desired, brake pipe pressure is completely exhausted in the usual manner. Service limiting valve 12 operates the same as just explained, while, concurrently, emergency limiting valve 13 remains open to convey the combined air in the auxiliary and emergency reservoirs to the brake cylinder(s) via delivery pipes 9a, 9b. In a full load condition, full pressure equalization is obtained, since the force of brake cylinder feedback pressure effective in chamber 17 and acting on piston 14 is insufficient to counteract the opposing force of air spring pressure in chamber 20 and spring 16 acting on piston 14. Consequently, cut-off valve element 27 is held open throughout the entire brake application, so that the emergency buildup of brake cylinder pressure is unmodulated.

Under partial or empty load conditions, during an emergency application, the force of air spring pressure in chamber 20 and spring 16 acting on piston 14 is unable to counteract the opposing force of brake cylinder pressure effective in chamber 17 and acting on piston 14 throughout the entire buildup of brake cylinder pressure. This results in closure of cut-off valve element 27, to limit buildup of emergency brake cylinder pressure as a function of the car load, it being noted that such closure of emergency limiting valve 13 serves to isolate volume reservoir 35 from brake cylinder(s) 5 and thereby provide more positive control of the emergency modulated brake pressure than would otherwise be obtained if the emergency limiting valve were located upstream, i.e., in the emegency reservoir supply line, as in the embodiment of FIG. 1.

Release of either a service or emergency application is made by increasing brake pipe pressure to cause control valve 2 to exhaust the brake cylinder pressure via vent pipe 10, while concurrently connecting brake pipe pressure to the auxiliary and emergency supply pipes 7 and 8. At emergency limiting valve 13, the brake cylinder feedback pressure effective in chamber 17 follows brake cylinder pressure to atmosphere via the cut-off check valve 15. The volume and auxiliary reservoirs are concurrently charged, as previously explained, during this exhaust of brake cylinder pressure, in readiness for a subsequent brake application.

I claim:
1. A vehicle brake control system comprising:
   (a) braking means;
   (b) a brake pipe normally charged to a certain chosen pressure;
   (c) an auxiliary reservoir;
   (d) control valve means for establishing fluid pressure communication between said brake pipe and said auxiliary reservoir to effect charging of said auxiliary reservoir to the pressure of said brake pipe during a brake release and thereby provide a first source of supply fluid under pressure;
   (e) a first fluid pressure supply path between said control valve means and said auxiliary reservoir;
   (f) a fluid pressure delivery path between said control valve means and said braking means;
   (g) a supplemental volume reservoir in said first fluid pressure supply path charged to the pressure of said auxiliary reservoir to provide a second source of fluid under pressure, said control valve means being operative during brake application to establish fluid pressure communication of said auxiliary and supplemental volume reservoirs with said braking means via said first supply path and said delivery path, whereby an unmodulated buildup of brake pressure is realized at said braking means in accordance with the combined supply of said first and second sources of fluid under pressure thereto; and (h) variable load valve means for interrupting said first supply path upstream of said supplemental volume reservoir to isolate said auxiliary reservoir from said braking means, whereby a modulated buildup of brake pressure is realized at said braking means is accordance with the supply of said second source of fluid pressure thereto in the absence of said supply of said first source of fluid pressure.

2. A brake control system as recited in claim 1, wherein said variable load valve means interrupts said first supply path when the unmodulated buildup of braking pressure reaches a value that varies as a function of the load carried by said vehicle.

3. A brake control system as recited in claim 2, further comprising vehicle fluid pressure support means for providing a load weight pressure that varies as a function of the load carried by said vehicle.

4. A brake control system as recited in claim 3, wherein said variable load valve means includes a first variable load valve comprising:
  (a) a check valve in said first supply path;
  (b) a first bias spring acting on said check valve in a direction to effect closure thereof;
  (c) a control piston subject to the differential force of said braking pressure acting in one direction corresponding to said direction of closure of said check valve and to said load weight pressure acting in the opposite direction corresponding to the direction of opening of said check valve; and
  (d) actuating means for effecting said opening of said check valve in accordance with movement of said control piston in said opposite direction only when said volume reservoir is charged with fluid under pressure to within a predetermined amount of said auxiliary reservoir fluid under pressure.

5. A brake control system as recited in claim 4, further characterized in that said check valve is located in said supply path between said auxiliary reservoir and said supplemental volume reservoir such as to be subject on opposite sides to the respective pressure thereof.

6. A brake control system as recited in claim 5, wherein said actuating means comprises:
  (a) a hollow member engageable at one end thereof with said check valve on the side opposite said first bias spring, said hollow member having an inturned flange spaced-apart from said one end;
  (b) a stem of said control piston having a projecting end disposed within said hollow member between said one end and said inturned flange, said projecting end having a shoulder adapted to engage said inturned flange in said one direction of movement of said control piston and to disengage said inturned flange in said opposite direction of movement of said control piston, in which direction said stem is movable without imparting movement to said hollow member; and
  (c) a second bias spring acting on said hollow member to urge said check valve in said opening direction.

7. A brake system as recited in claim 6, wherein the force exerted on said check valve by said second bias spring is greater than the force exerted by said first bias spring.

8. A brake control system as recited in claim 7, further characterized in that said stem is fixed to said control piston and said second bias spring is located in a cavity housing said check valve so as to act between the outer surface of said hollow member and the casing forming the cavity housing said check valve.

9. A brake control system as recited in claim 7, further characterized in that said one end of said hollow member is closed and said second bias spring is located within the hollow of said hollow member so as to act between said closed end thereof and said shoulder of said stem.

10. A brake control system as recited in claim 4, further comprising:
  (a) an emergency reservoir charged to said certain chosen pressure to provide a third source of supply fluid under pressure;
  (b) a second fluid pressure supply path between said emergency reservoir and said control valve means, said control valve means being operative to establish fluid pressure communication between said emergency reservoir and said braking means via said second supply path and said delivery path when said brake application is an emergency brake application; and
  (c) said variable load valve means including a second variable load valve between said emergency reservoir and said braking means.

11. A brake control system as recited in claim 10, wherein said second variable load valve comprises:
  (a) a check valve in said second supply path;
  (b) biasing means acting on said check valve in a direction for effecting closure thereof;
  (c) a control piston subject to the differential force of said braking pressure acting in one direction corresponding to said direction of closure of said check valve and to said vehicle load weight pressure acting in the opposite direction corresponding to the direction of opening of said check valve; and
  (d) actuating means between said control piston and said check valve for opening said check valve when said control piston is moved in said opposite direction, said closure of said check valve in said second supply path interrupting said fluid pressure communication between said emergency reservoir and said brake means when said braking pressure exceeds a value that varies as a function of the load carried by said vehicle.

12. A brake control system as recited in claim 11, wherein each said first and second variable load valve means further comprises adjustable spring means for providing a constant force acting on said control piston in said opposite direction.

13. A brake control system as recited in claim 12 wherein said adjustable spring means of said second variable load valve is set to exert a greater force on said control piston than the force exerted by said adjustable spring means of said first variable load valve.

14. A brake control system as recited in claim 4, further comprising:
  (a) an emergency reservoir charged to said certain chosen pressure to provide a third source of supply fluid under pressure;

(b) a second fluid pressure supply path between said emergency reservoir and said control valve means, said control valve means being operative to establish fluid pressure communication between said emergency reservoir and said braking means via said second supply path and said delivery path when said application is an emergency brake application; and (c) said variable load valve means including a second variable load valve disposed in said delivery path.

15. A brake control system as recited in claim 14, wherein said second variable load valve comprises:
   (a) a check valve in said delivery path;
   (b) biasing means acting on said check valve in a direction for effecting closure thereof;
   (c) a control piston subject to the differential force of said braking pressure acting in one direction corresponding to said direction of closure of said check valve and to said vehicle load weight pressure acting in the opposite direction corresponding to the direction of opening of said check valve; and
   (d) actuating means between said control piston and said check valve for opening said check valve when said control piston is moved in said opposite direction, said closure of said check valve in said delivery path interrupting said fluid pressure communication between said emergency reservior and said braking means when said braking pressure exceeds a value that varies as a function of the load carried by said vehicle.

16. A brake control system as recited in claim 1, wherein said variable load valve means comprises:
   (a) inshot valve means for interrupting said first supply path to provide said isolation of said auxiliary reservoir from said brake means in response to said braking pressure reaching a predetermined value to initiate a modulation phase of brake control during which said modulated buildup of braking pressure is provided; and
   (b) a first variable load valve in said first supply path in parallel with said inshot valve means for establishing fluid pressure communication between said auxiliary reservoir and said braking means in bypass of said inshot valve means when said modulated buildup of braking pressure reaches a value that varies as a function of the load carried by said vehicle to thereby provide an unmodulated buildup of braking pressure during said modulation phase of brake control.

17. A brake control system as recited in claim 16, further characterized in that prior to said braking pressure reaching said predetermined value, said first variable load valve is operative in response to a full load condition of said vehicle to establish fluid pressure communication between said auxiliary reservoir and said braking means, whereby said unmodulated buildup of braking pressure is provided prior to said modulation phase of brake control being established.

18. A brake control system as recited in claim 17, wherein said first variable load valve comprises:

(a) a check valve in said first supply path between said auxiliary reservoir and said supplemental volume reservoir;
(b) biasing means acting on said check valve in a direction for effecting closure thereof;
(c) a control piston subject to a differential force in the direction of closure of said check valve, said differential force varying as a function of the load carried by said vehicle; and
(d) a stem of said piston engageable with said check valve.

19. A brake control system as recited in claim 18, further characterized in that said differential force is inversely proportional to said load carried by said vehicle.

20. A brake control system as recited in claim 18, further comprising vehicle fluid pressure support means for providing a load weight pressure that varies as a function of the load carried by said vehicle.

21. A brake control system as recited in claim 20, further characterized in that said control piston is subject on one side to the force of a spring acting in the direction of closure of said check valve and on the opposite side to the force of said load weight pressure acting in the direction of opening of said check valve to thereby provide said differential force.

22. A brake control system as recited in claim 21, further characterized in that said spring force is adjustable.

23. A brake control system as recited in claim 20, further comprising:
   (a) an emergency reservoir charged to said certain chosen pressure to provide a third source of supply fluid under pressure;
   (b) a second fluid pressure supply path between said emergency reservoir and said control valve means, said control valve means being operative to establish fluid pressure communication between said emergency reservoir and said braking means via said second supply path and said delivery path when said application is an emergency brake application; and
   (c) said variable load valve means including a second variable load valve disposed in said delivery path.

24. A brake control system as recited in claim 23, wherein said second variable load valve comprises:
   (a) a check valve in said second supply path;
   (b) biasing means acting on said check valve in a direction for effecting closure thereof;
   (c) a control piston subject to said differential force of said braking pressure acting in one direction corresponding to said direction of closure of said check valve and to said vehicle load weight pressure acting in the opposite direction corresponding to the direction of opening of said check valve; and
   (d) actuating means between said control piston and said check valve for opening said check valve when said control piston is moved in said opposite direction.

* * * * *